United States Patent [19]

Matsuzaki

[11] Patent Number: 5,280,395
[45] Date of Patent: Jan. 18, 1994

[54] HARD DISC TRACK DEFECT DETECTING APPARATUS

[75] Inventor: Ryuichi Matsuzaki, Narashino, Japan

[73] Assignee: Seiko Seiki Kabushiki Kaisha, Japan

[21] Appl. No.: 692,636

[22] Filed: Apr. 29, 1991

[30] Foreign Application Priority Data

May 11, 1990 [JP] Japan .................. 2-121486

[51] Int. Cl.⁵ .......................... G11B 27/36; G11B 5/09
[52] U.S. Cl. ...................... 360/31; 324/212;
369/53
[58] Field of Search ............ 360/31, 39, 137;
369/53, 69; 324/210, 211, 212, 226, 227

[56] References Cited
U.S. PATENT DOCUMENTS 4,949,036 8/1990 Bezinque et al. ............ 360/31 X

*Primary Examiner*—David Mis
*Attorney, Agent, or Firm*—Bruce I. Adams; Van C. Wilks

[57] ABSTRACT

An apparatus for detecting defects in a processing track on a hard disc uses an average or mean average level value as a reference value, in which an arithmetic means computes the average or mean average level value based on an average level value (Track Average Amplitude or TAA) for a plurality of tracks prior to the processing track which is stored in a memory means. The apparatus enables obtaining the reference value with less dispersion, which gives even and stable detected results of any defect in each track on the hard disc, and enables improvement in the efficiency of the throughput.

20 Claims, 5 Drawing Sheets

FIG. 2

TRACK No.

| | | | | |
|---|---|---|---|---|
| n−5 | SIGNAL WRITE | MP TAA$_0$ | SIGNAL ERASE | EP |
| n−4 | SIGNAL WRITE | MP TAA$_1$ | SIGNAL ERASE | EP |
| n−3 | SIGNAL WRITE | MP TAA$_2$ | SIGNAL ERASE | EP |
| n−2 | SIGNAL WRITE | MP TAA$_3$ | SIGNAL ERASE | EP |
| n−1 | SIGNAL WRITE | MP TAA$_4$ | SIGNAL ERASE | EP |
| n | SIGNAL WRITE | MP TAA$_0$ | SIGNAL ERASE | EP |

FIG. 5(a) PRIOR ART

| SIGNAL WRITE | MP TAA | SIGNAL ERASE | EP |
|---|---|---|---|

FIG. 5(b) PRIOR ART

| SIGNAL WRITE | TAA | MP | SIGNAL ERASE | EP |
|---|---|---|---|---|

HARD DISC TRACK DEFECT DETECTING APPARATUS

BACKGROUND OF THE INVENTION

The present invention relates to a hard disc measuring apparatus. More specifically, the invention relates to measuring a reference value Track Average Amplitude (TAA), which is an average level amplitude value of a track, while at the same time accurately detecting defects in the hard disc tracks.

In the conventional hard disc measuring apparatus, read/write means writes signals on the hard disc after an average track level value is read out by the read/write means. This average track level value is used as a reference value TAA. A read value which takes on a certain level below the reference value TAA is known as an MP (Missing-Pulse) value. A read value which takes on a certain level above the reference value TAA is known as an EP (Extra-Pulse) value after attempted erasure of the signal.

Any portion of the track at which it is impossible to write to sufficiently even after the read/write means attempts to write the signal to the hard disc, or at which a written signal is not completely erased even though it should have been erased, is considered to have a defect.

There are two methods for determining the reference value TAA using the conventional hard disc measuring apparatus and for detecting a defect in the tracks of the hard disc, as described in FIGS. 5(a) and 5(b). The first method is based on the TAA of a finished track. This is structured to measure the processing track (the track presently under a measuring process) based on the TAA of a finished track (a prior or previous track already measured one track earlier).

The second method is based on the TAA of the processing track. This is structured to measure a processing track based on the TAA of the processing track itself after measurement of the TAA of the processing track.

The conventional measuring apparatus has problems associated with it. In the first method described above, the TAA of a track prior to the track being measured is used alternatively for the reference value TAA of the processing track to improve throughput, in which the reference value TAA can be measured, while at the same time a defect can be detected.

However, in this method, the reference value TAA is different from the TAA of the track being processed for a defect. The reference value TAA includes dispersion in the writing and reading of signals, which produces dispersion in the process of detecting a defect of the track in the hard disc.

In the second method described above, the written signals for measuring the reference value TAA and for detecting a defect become the same, provided that the value of the TAA of a track being measured is used as the reference value TAA. The reference value TAA includes dispersion merely in the reading of signals, and defect detecting signals having less dispersion are advantageous over the first method.

However, this method has a problem relating to deteriorating throughput because the reference value TAA has to be read before detecting a defect.

SUMMARY OF THE INVENTION

It is an object of the present invention to provide a hard disc measuring apparatus capable of improving throughput efficiency for obtaining a reference value TAA with less dispersion in detecting a defect, for obtaining a stable defect detecting process, and for outputting the reference value TAA and defect detection results at the same time.

The hard disc measuring apparatus of the present invention comprises:

read/write means for reading data from a hard disc and writing the data onto the hard disc;

a parametric measurement circuit for measuring an average level value of each track in the hard disc from signals outputted from the read/write means and for outputting the measured signals to a databus;

a defect detection circuit for detecting a defect in each track in the hard disc and outputting the detected signals to the databus;

an interface circuit connected to the databus for outputting the measured values from the parametric measurement and defect detection circuits;

arithmetic means connected to the interface circuit for inputting the average level value of each of the plural number of tracks outputted from the parametric measurement circuit and for computing the average or mean average level value; and a memory for storing the average or mean average level value of the plural number of tracks computed by the arithmetic means.

The structure of the present invention allows outputting the measured reference value TAA and the detected defect signals at the same time. When attempting to detect a defect in a track of the hard disc, TAAs in a plural number of measured tracks preceding the track presently under measurement are stored, and the TAAs in the plural number of these measured tracks are averaged. This average (or mean) TAA value is taken as the reference value TAA in order to detect any defect in the processing track of the hard disc. This enables obtaining the reference value TAA with less dispersion, which gives even and stable detected results of any defects in the tracks of the hard disc, and enables improvement in the efficiency of the throughput.

BRIEF DESCRIPTION OF THE DRAWINGS

FIG. 2 shows an illustrative diagram explaining the steps of inputting the data to the memory according to the present invention;

FIGS. 5(a) and (b) illustrate the table content to be written in the memory according to the prior art.

DETAILED DESCRIPTION OF THE PREFERRED EMBODIMENT

The present invention is hereinafter described with reference to the drawings which illustrate an embodiment of a hard disc measuring apparatus according to the invention.

Figure 1:
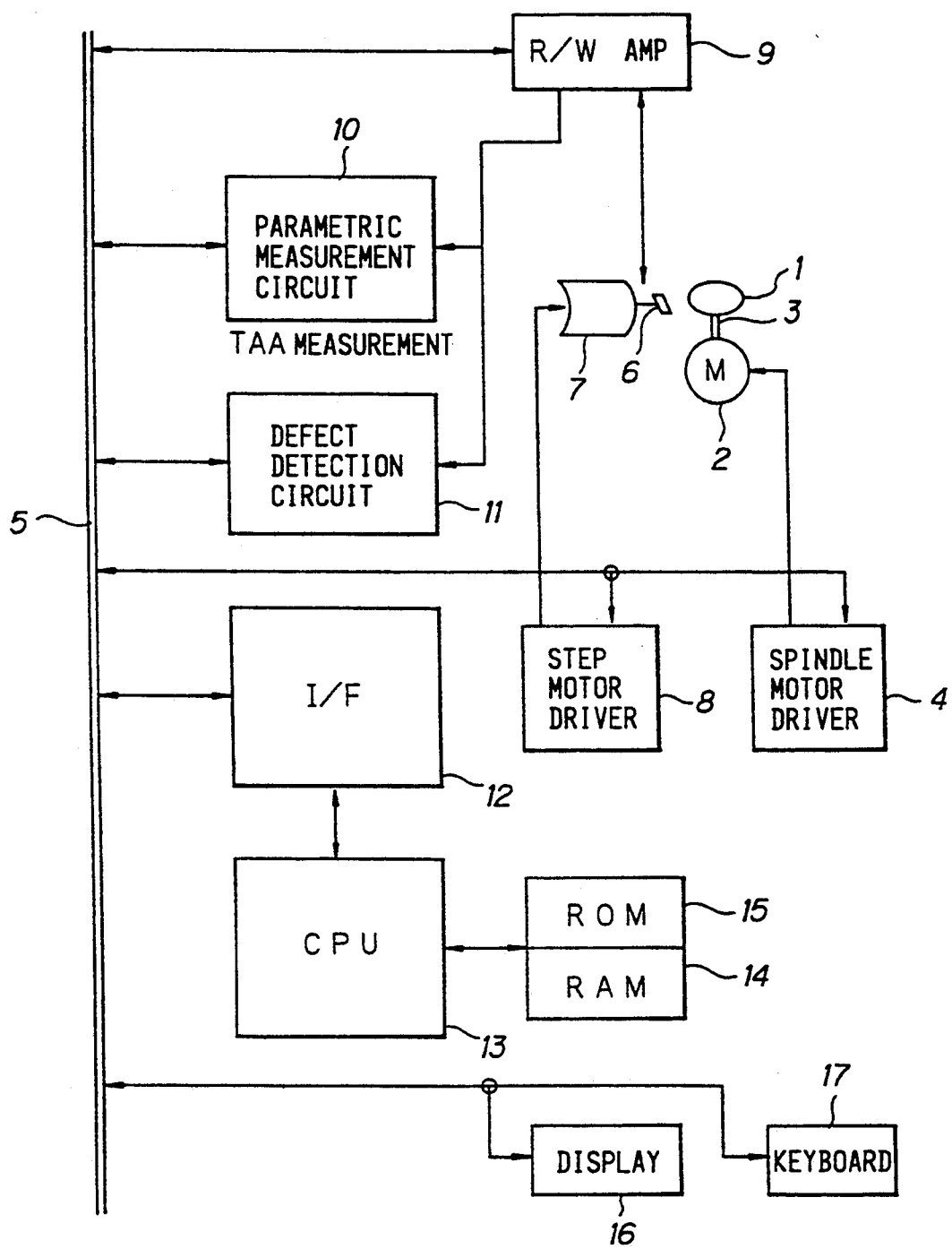
FIG. 1 shows a circuit block diagram of the present invention.

As described in FIG. 1, a hard disc 1 containing tracks is attached to a spindle 3 of a motor 2 and is structured to be rotated. The motor 2 is connected to a databus 5 through a spindle motor driver circuit 4.

A head 6 writes data to and reads data from a track of the hard disc 1. The head 6 is carried by a carriage 7 and is structured to read/write in an orderly manner to and from the track in the hard disc 1. The carriage 7 is coupled to the databus 5 through the step motor driver circuit 8 to drive the carriage 7.

The head 6 is coupled to the databus 5 through the read/write signal amplifying circuit, that is, R/W amplifier 9. The R/W amplifier and the head 6 comprise a read/write means. The output portion fixed to the R/W amplifier 9 is separately structured to output the R/W signals of the track in the hard disc 1 to both a measuring means such as a parametric measurement circuit 10 and a defect detecting means such as a defect detection circuit 11.

The parametric measurement circuit 10 is structured to input the signals of each track received from the R/W amplifier 9, and to measure the average level of the signals, in other words the TAA, and then to output the TAA to the databus 5.

The defect detection circuit 11 is also structured to input the signals of each track received from the R/W amplifier 9, and to detect any defect in the signals, and then to output the defect signal to the databus 5.

The databus 5 is connected to a CPU 13 through an interface circuit 12 (hereunder referred to as the I/F circuit).

As shown in FIG. 2, the CPU 13 controls storage of the TAA value of five tracks preceding the track n under measurement inputted from the I/F circuit 12 into a storage means such as a RAM 14 through the databus 5. The CPU 13 also functions as an arithmetic means to compute and average the five TAAs stored in the RAM 14 to arrive at a reference value TAA. Then the CPU 13 computes a threshold level based on the computed reference value TAA, and this threshold level is sent to the defect detection circuit 11 via the I/F circuit and the databus 5 to detect a defect, should one be present. The results are totaled by the CPU 13 and stored in the RAM 14.

The arithmetic and the input/output control programs for the reference value TAA and the defect signals are stored in the programming ROM 15.

In the described embodiment, the CPU 13 is programmed to compute the average or mean average level value by inputting TAAs of five tracks immediately preceding the track under the measuring process. However, any plural number of tracks preceding the track under the measuring process is sufficient to compute an average or mean average level value.

A display 16 demonstrates each data signal fed through the databus 5. The keyboard 17 is for the control of the system operation.

Figure 3:
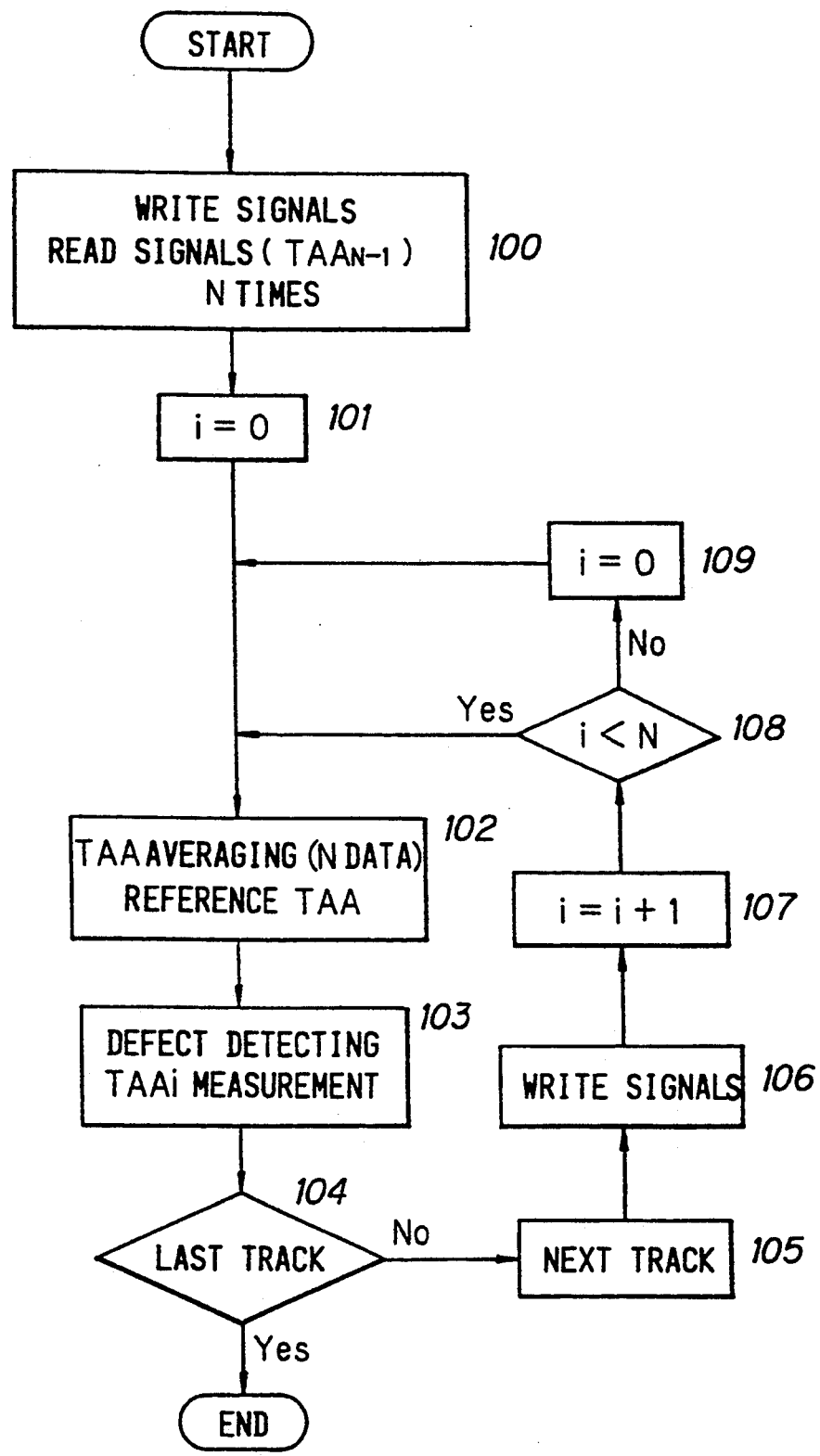
FIG. 3 shows a flow chart of the measuring method according to the present invention.

The operation of the apparatus of the present invention according to the described embodiment is explained in accordance with the flow chart in FIG. 3 as follows:

First, when the apparatus is switched on, it is ready to start under conditions enabling write signals to be written with the head 6 to the tracks of the hard disc 1.

Then, the head 6 writes signals to the tracks of the hard disc 1 (step 100). The signals written in the tracks in the hard disc 1 are read by the parametric measurement circuit 10 after passing through the head 6 and the R/W amplifier 9. In the preferred embodiment, this read/write process is repeated for five tracks and is stored in the data table as $TAA_0$–$TAA_4$ in the RAM 14 through the databus 5, the I/F circuit 12, and the CPU 13.

At step 101 the counter i is set to 0 to indicate the address 0 in the data table as $TAA_0$–$TAA_{n-1}$ of the RAM 14.

At step 102, TAAs of the five tracks stored in the RAM 14 are inputted to the CPU 13 and mathematical operations are carried out to average out the TAA values to arrive at the reference TAA value.

Step 103 is then carried out to detect any defect and to measure the reference value TAA. As described in FIG. 2, the defect detection begins with the signals to be written into the hard disc 1. The CPU 13 averages the values $TAA_0$–$TAA_4$ stored in the RAM 14. This average is set as a reference value TAA in the tracks, and a threshold level is computed to measure the missing pulse value MP. The threshold level is sent to the defect detection circuit 11. The written signals in the hard disc 1 are inputted to the parametric measurement circuit 10 and the defect detection circuit 11 through the head 6 and the R/W amplifier 9, and then the TAA and MP values are measured. The measured TAA is stored in the data table $TAA_i$ specified by the counter i and the measured MP is stored in the RAM 14.

Next, the signals written in the hard disc 1 are erased. The CPU 13 computes the threshold level for the EP (Extra-Pulse) measurement based on the predetermined reference value TAA.

The threshold level is sent to the defect detection circuit 11, the signals erased by the hard disc 1 are inputted to the defect detection circuit 11 through the head 6 and the R/W amplifier 9, and the EP value is measured. The EP measurement results are stored in the RAM 14.

The measurement is concluded in step 104, if the defect detection track is found to be the last track in the hard disc 1 (judged as YES). The operation proceeds to step 105 if it is found not to be the last track (judged as NO).

In step 105 the carriage 7 transfers the head 6 to the next track in the hard disc 1 in order to measure the next track in the hard disc 1.

Proceeding to step 106, the signals are written in the hard disc 1. The value 1 is added to the counter i in step 7.

In step 108, if the value i is less than N (N=5 in FIG. 3), the operation returns to step 102. If i is not less than N, the operation executes i=0 in step 109, and then proceeds to step 102.

The measurement is concluded when the process reaches the last track in the hard disc 1 after the above steps are repeated sequentially.

Figure 4:
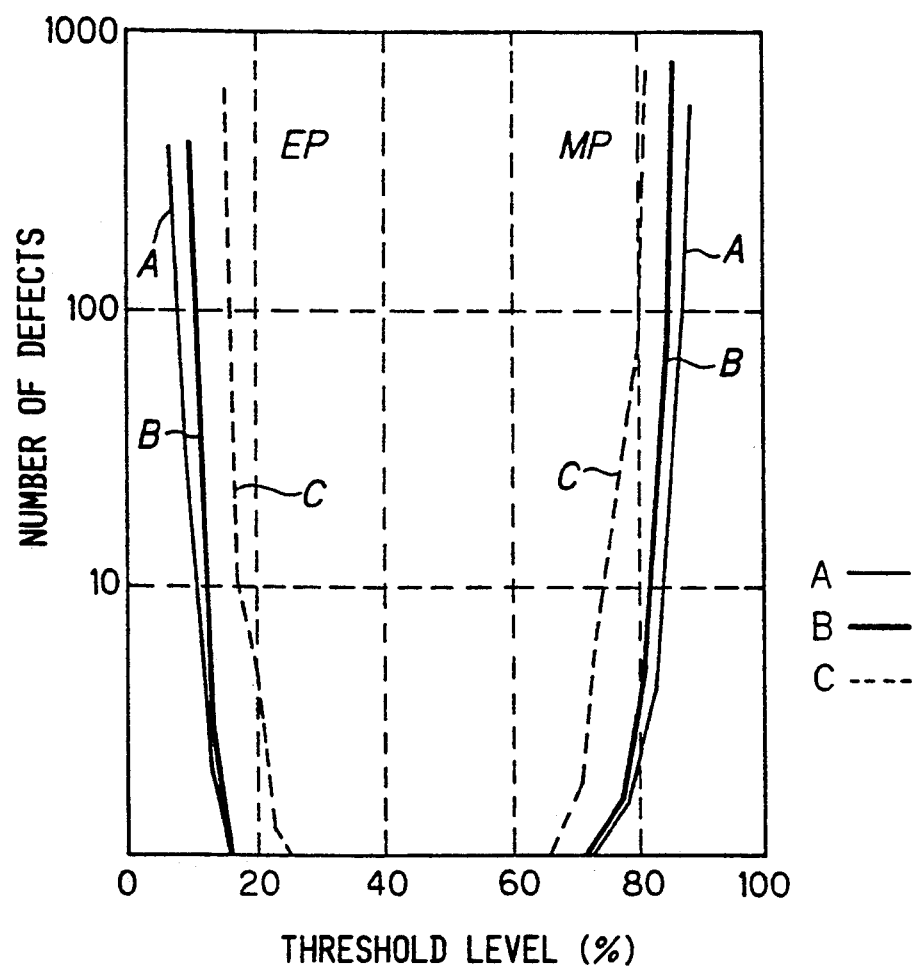
FIG. 4 is a graph showing a comparison between the present invention and the prior art.

FIG. 4 is a graph demonstrating the above specified characteristics in the apparatus of the present invention in comparison with that of the prior art.

The graph demonstrates how the detection of defects in the bucket curve of EP and MP is changed by the threshold level.

As expressed by the graph, the characteristics of the present invention (line B in the graph) show approximate equality in the number of defects detected under the same threshold level in comparison with the defects detected under the TAA of the processing track (line A in the graph), and shows dramatic reduction in the number of defects detected under the TAA one track prior to the processing track (line C in the graph). This effectively eliminates the influence of dispersion resulting from read/write and demonstrates the achieved highly accurate measurement level.

Moreover, the efficiency of the throughput is improved due to simultaneity of the measurement of a reference value TAA and the detecting of a defect via comparison with measurement based on the TAA of the processing track.

As described in the foregoing, in the present invention, when the track in the hard disc is measured, TAA values of tracks preceding the processing track are stored in memory, TAAs of those tracks are averaged by arithmetic means, and the defect is detected based on this average value which serves as the reference value TAA.

This enables gaining the reference value TAA with less dispersion, which gives constant detecting results of the defects in the hard disc. It is also effective to improve the efficiency of throughput due to the structure which is capable of outputting the reference value TAA and the detected defects at the same time.

I claim:

1. An apparatus for detecting defects in each track on a hard disc, comprising:
   read/write means for writing a test signal on a hard disc and reading said test signal on said hard disc;
   parametric measurement means for measuring an average level value for each track on said hard disc based on signals outputted from said read/write means;
   memory means for storing said average level value for a plurality of said tracks prior to a processing track on said hard disc;
   arithmetic means coupled to said parametric measurement means for computing an average average level value based on said average level value for said plurality of said tracks; and
   defect detection means for detecting defects in said processing track on said hard disc based on signals outputted from said read/write means and said average average level value for said plurality of said tracks.

2. An apparatus according to claim 1, wherein the read/write means comprises a read/write amplifier connected to a head which writes data to and reads data from the hard disc tracks.

3. An apparatus according to claim 1, including means for displacing the read/write means in order to select a track for measurement by the parametric measurement means or as the processing track.

4. An apparatus according to claim 1, wherein the storage means comprises a RAM.

5. An apparatus according to claim 1, wherein the arithmetic means comprises a CPU.

6. An apparatus according to claim 5, wherein the arithmetic means further comprises a ROM.

7. An apparatus according to claim 1, wherein the plurality of tracks comprises five tracks.

8. An apparatus according to claim 1, wherein the defect detection means comprises a defect detection circuit.

9. An apparatus according to claim 1, including a data bus for providing interconnection between the read/write means, the parametric measurement means, the memory means, the arithmetic means and the defect detection means.

10. An apparatus for detecting defects in the tracks of a hard disc, comprising:
    read/write means for writing a test signal to a hard disc and for reading the test signal from the hard disc;
    measuring means for measuring a track average amplitude for each track of the hard disc based on signals provided by the read/write means;
    storage means for storing the track average amplitude of each of a plurality of the tracks preceding a track being processed;
    arithmetic means connected to the storage means for computing a mean track average amplitude based on the track average amplitude of each of the plurality of tracks preceding the track being processed; and
    defect detecting means for detecting a defect in the track being processed on the basis of the signals provided by the read/write means and on the means track average amplitude.

11. An apparatus according to claim 10, wherein the read/write means comprises a read/write amplifier connected to a head which writes data to and reads data from the hard disc tracks.

12. An apparatus according to claim 11, including means for displacing the read/write means in order to select a track for measuring by the measuring means or as the track to be processed.

13. An apparatus according to claim 12, wherein the means for displacing comprises a step motor driver connected to the head via a carriage.

14. An apparatus according to claim 10, wherein the storage means comprises a RAM.

15. An apparatus according to claim 10, wherein the arithmetic means comprises a CPU.

16. An apparatus according to claim 15, wherein the arithmetic means further comprises a ROM.

17. An apparatus according to claim 10, wherein the plurality of tracks comprises five tracks.

18. An apparatus according to claim 10, wherein the measuring means comprises a parametric measuring circuit.

19. An apparatus according to claim 10, wherein the defect detecting means comprises a defect detection circuit.

20. An apparatus according to claim 10, including a data bus for providing interconnection between the read/write means, the measuring means, the storage means, the arithmetic means and the defect detecting means.

* * * * *